(12) United States Patent
Everaerts et al.

(10) Patent No.: US 7,008,680 B2
(45) Date of Patent: Mar. 7, 2006

(54) HEAT-ACTIVATABLE ADHESIVE

(75) Inventors: Albert I. Everaerts, Oakdale, MN (US); Lang N. Nguyen, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 96 days.

(21) Appl. No.: 10/613,231

(22) Filed: Jul. 3, 2003

(65) Prior Publication Data

US 2005/0003222 A1 Jan. 6, 2005

(51) Int. Cl.
*B32B 33/00* (2006.01)

(52) U.S. Cl. .................. 428/40.1; 428/343; 525/100; 525/103; 525/281; 525/293; 525/300; 525/301; 525/305; 525/328.2; 525/329.2

(58) Field of Classification Search .............. 428/40.1, 428/343; 525/100, 103, 281, 293, 300, 301, 525/305, 328.2, 329.2
See application file for complete search history.

(56) References Cited

U.S. PATENT DOCUMENTS

| | | | |
|---|---|---|---|
| 3,299,010 A | 1/1967 | Samour | |
| 3,635,754 A | 1/1972 | Beede | |
| 4,135,033 A | 1/1979 | Lawton | |
| 4,329,384 A | 5/1982 | Vesley et al. | |
| 4,330,590 A | 5/1982 | Vesley | |
| 4,379,201 A | 4/1983 | Heilmann et al. | |
| 4,707,388 A | 11/1987 | Park et al. | |
| 4,737,559 A | 4/1988 | Kellen et al. | |
| 5,156,911 A | 10/1992 | Stewart | |
| 5,387,450 A | 2/1995 | Stewart | |
| 5,552,451 A | 9/1996 | Everaerts et al. | |
| 5,648,425 A | 7/1997 | Everaerts et al. | |
| 5,888,650 A | 3/1999 | Calhoun et al. | |
| 5,889,118 A | 3/1999 | Delgado et al. | |
| 6,060,480 A | 5/2000 | Nakamura et al. | |
| 6,080,480 A | 6/2000 | Shiba et al. | |
| 6,437,070 B1 | 8/2002 | Parker et al. | |
| 6,509,128 B1 | 1/2003 | Everaerts et al. | |
| 2002/0088535 A1 | 7/2002 | Hsu et al. | |
| 2002/0090480 A1 | 7/2002 | Hsu et al. | |
| 2002/0090509 A1 | 7/2002 | Hsu et al. | |
| 2003/0113533 A1 | 6/2003 | Husemann et al. | |

FOREIGN PATENT DOCUMENTS

| | | |
|---|---|---|
| CA | 2246275 | 2/2000 |
| DE | 195 27 789 A1 | 2/1996 |
| EP | 1 201 724 A1 | 5/2002 |
| JP | 2000-355684 | 12/2000 |
| JP | 2002-12838 | 1/2002 |
| WO | WO 90/13420 | 4/1990 |
| WO | WO 92/00361 | 1/1992 |
| WO | WO 9608540 A2 | 3/1996 |
| WO | WO 00/77114 A1 | 12/2000 |

OTHER PUBLICATIONS

U.S. Appl. No. 10/424,218, filed Apr. 25, 2003, Linerless Printable Adhesive Tape.
U.S. Appl. No. 10/613,249, filed Jul. 3, 2003, Cling Articles.

*Primary Examiner*—Bernard Lipman

(57) ABSTRACT

Heat-activatable adhesives comprise a semi-crystalline polymer. The semi-crystalline polymer comprises alkyl (meth)acrylate monomer units having an alkyl group that contains at least about 20 carbon atoms, alkyl (meth)acrylate monomer units having an alkyl group that contains from about 4 to about 12 carbon atoms, and optionally ethylenically-unsaturated non-acidic polar monomer units. Methods for making heat-activatable adhesives and articles therefrom are also included.

49 Claims, No Drawings

HEAT-ACTIVATABLE ADHESIVE

BACKGROUND

Pressure-sensitive adhesives (PSAs) are well known and are used in a variety of industrial, consumer and medical applications. The term "pressure-sensitive adhesive" is generally used to designate adhesive materials that will stick to a surface when pressed with simple hand pressure and that have sufficient internal strength that the same can be removed from the surface to which they have been adhered without substantial portions of the adhesive separating from the main adhesive mass. Because of their tackiness, pressure-sensitive adhesives are generally difficult to use for bonding an object coated with the pressure-sensitive adhesive to a substrate whenever it is desired to position the object relative to the substrate by sliding it while the two are in adhesive contact (e.g., mounting a photograph in a scrapbook).

Various known methods for providing such positionability by sliding include placement of particles on the surface of the pressure-sensitive adhesive, and disposing the pressure-sensitive adhesive within recesses in the surface of the object to be adhered. In both cases, the pressure-sensitive adhesive remains physically separated from the surface of the substrate to be bonded until pressure is applied. However, in the normal course of handling such objects, sufficient pressure may be inadvertently applied to such objects (e.g., if they are large and unwieldy) that they become adhered to the substrate before they are properly positioned.

In contrast, hot melt adhesives typically have essentially no adhesive characteristics until heated to their melting point, at which temperature they flow and adhere readily to other surfaces on contact. As the adhesive flows, it typically penetrates any porous materials (e.g., bricks, fabrics, wood) that it contacts to form mechanical entanglements upon cooling to room temperature. With smooth nonporous surfaces, mechanical entanglement is not generally possible, and after the adhesive cools the resultant bond is typically poor. Thus, hot melt adhesives are normally used to form permanent adhesive bonds to porous materials and not to smooth nonporous surfaces.

It would be desirable to have a new adhesive and method for adhering an object to a substrate, including a smooth substrate, which new adhesive and method allow the object to be positioned relative to the substrate by sliding without accidental adhesion occurring before the object is correctly positioned.

SUMMARY

In one aspect, the present invention provides a heat-activatable adhesive comprising a semi-crystalline polymer, the semi-crystalline polymer comprising:
 (a) about 20 to about 70 percent by weight of alkyl (meth)acrylate monomer units having an alkyl group that contains at least about 20 carbon atoms; and
 (b) about 80 to about 30 percent by weight of alkyl (meth)acrylate monomer units having an alkyl group that contains from about 4 to about 12 carbon atoms, wherein the polymer has an activation temperature of at least about 40 degrees Celsius, and wherein the polymer is essentially free of acidic groups.

In one aspect, the present invention provides a heat-activatable adhesive comprising a semi-crystalline polymer, the semi-crystalline polymer comprising:
 (a) about 20 to about 70 percent by weight of alkyl (meth)acrylate monomer units having an alkyl group that contains at least about 20 carbon atoms;
 (b) about 80 to about 30 percent by weight of alkyl (meth)acrylate monomer units having an alkyl group that contains from about 4 to about 12 carbon atoms; and
 (c) ethylenically-unsaturated non-acidic polar monomer units in an amount of less than about 20 percent by weight, wherein the polymer has an activation temperature of at least about 40 degrees Celsius, and wherein the polymer is essentially free of acidic groups.

In one aspect, the present invention provides a method of making a heat-activatable adhesive comprising:
 (a) providing a mixture of polymerizable components comprising about 20 to about 70 percent by weight of alkyl (meth)acrylate monomer having an alkyl group that contains at least about 20 carbon atoms, about 80 to about 30 percent by weight of alkyl (meth)acrylate monomer having an alkyl group that contains from about 4 to about 12 carbon atoms; and
 (b) polymerizing the mixture to provide a semi-crystalline polymer, wherein the semi-crystalline polymer has an activation temperature of at least about 40 degrees Celsius, and wherein the polymer is essentially free of acidic groups.

In one aspect, the present invention provides method of making a heat-activatable adhesive comprising:
 (a) providing a mixture comprising about 20 to about 70 percent by weight of alkyl (meth)acrylate monomer having an alkyl group that contains at least about 20 carbon atoms; about 80 to about 30 percent by weight of alkyl (meth)acrylate monomer having an alkyl group that contains from about 4 to about 12 carbon atoms; and
 (b) polymerizing the mixture to provide a semi-crystalline polymer.

In one aspect, the present invention provides heat-activatable adhesive article comprising:
 a substrate having a major surface; and
 a layer of heat-activatable adhesive comprising a semi-crystalline polymer and supported on at least a portion of the major surface, wherein the semi-crystalline polymer comprises:
  (a) about 20 to about 70 percent by weight of alkyl (meth)acrylate monomer units having an alkyl group that contains at least about 20 carbon atoms; and
  (b) about 80 to about 30 percent by weight of alkyl (meth)acrylate monomer units having an alkyl group that contains from about 4 to about 12 carbon atoms, wherein the polymer is crosslinked, wherein the polymer has an activation temperature of at least about 40 degrees Celsius, and wherein the semi-crystalline polymer is essentially free of acidic groups.

In one aspect, the present invention provides a heat-activatable adhesive article comprising:
 a substrate having a major surface; and
 a layer of heat-activatable adhesive comprising a semi-crystalline polymer and supported on at least a portion of the major surface, wherein the semi-crystalline polymer comprises:
  (a) about 20 to about 70 percent by weight of alkyl (meth)acrylate monomer units having an alkyl group that contains at least about 20 carbon atoms;

(b) about 80 to about 30 percent by weight of alkyl (meth)acrylate monomer units having an alkyl group that contains from about 4 to about 12 carbon atoms; and (c) ethylenically-unsaturated non-acidic polar monomer units in an amount of less than about 20 percent by weight, wherein the polymer has an activation temperature of at least about 40 degrees Celsius.

In some embodiments, heat-activatable adhesives of the present invention may optionally be crosslinked.

In some embodiments, articles including heat-activatable adhesives of the present invention can be removably adhered to smooth substrates. Such articles can be handled without inadvertent adhesion until positioned as desired, and then activated by heating.

As used herein the term:

"activation temperature" refers to the minimum temperature below which a material is essentially non-tacky, yet becomes aggressively tacky if increased by two ° C.;

"aggressively tacky" means that the adhesive when applied to a piece of copy paper (commercially available under the trade designation "HAMMERMILL COPY PLUS, 20 LB WEIGHT" from International Paper, Memphis, Tenn. or its equivalent) using one pass (back and forth) of a 4.5 pound (2.0 kg) rubber roller will adhere securely to the paper and tear it when peeled by hand after the adhesive had a chance to cool back to room temperature;

"non-tacky" means that the adhesive when applied to a piece of copy paper (commercially available under the trade designation "HAMMERMILL COPY PLUS, 20 LB WEIGHT" from International Paper, Memphis, Tenn. or its equivalent) using one pass (back and forth) of a 4.5 pound (2.0 kg) rubber roller will not adhere securely to the paper, allowing it to be peeled from the adhesive without significant damage to the paper; and "(meth)acryl" includes both acryl and methacryl.

DETAILED DESCRIPTION

Heat-activatable pressure-sensitive adhesives according to the present invention comprise a semi-crystalline polymer formed by polymerization of monomers including at least one n-alkyl (meth)acrylate monomer wherein the n-alkyl group has at least about 20 carbon atoms (referred to herein after as the $C_{20+}$ (meth)acrylate monomer), at least one alkyl (meth)acrylate monomer wherein the alkyl group has from about 4 to about 12 carbon atoms (referred to herein after as the $C_4$–$C_{12}$ (meth)acrylate monomer), and optionally a non-acidic polar monomer.

Without wishing to be bound by theory, it is believed that $C_{20+}$ (meth)acrylate monomer units at concentrations used in the present invention impart a degree of crystallinity resulting in low tack at room temperature. The crystalline content of polymeric materials can be measured using differential scanning calorimetry, for example, according to the Crystallinity Content Determination test method given in the Examples section hereinbelow. In order to achieve adhesion, low tack at temperatures below the activation temperature, and removability, the degree of crystalline content should preferably be in a range of from at least about 5, 10, or even 15 percent crystalline content by weight up to and including about 20, 25, or even about 30 percent crystalline content by weight. Low crystalline content typically results in increased and permanent tack at room temperature, while higher levels of crystalline content typically result in little or no tack, even after heat activation.

In contrast, the $C_4$–$C_{12}$ alkyl (meth)acrylate monomer units contribute a degree of tack at room temperature or above. Optional non-acidic polar monomer units improve the adhesive strength of the adhesive.

$C_{20+}$ (meth)acrylate monomer units in the polymer may comprise from at least about 20, 30, 35, 40, or even about 45 percent by weight up to and including about 50, 55, 60, 65, or even about 70 percent by weight of the polymer. However, if the polymer does not include a non-acidic polar monomer, then the minimum amount of $C_{20+}$ (meth)acrylate monomer that should be included in the polymer is at least about 40 percent by weight.

Useful $C_{20+}$ (meth)acrylate monomers include, for example, cosanyl (meth)acrylate, eicosanyl (meth)acrylate, behenyl (meth)acrylate, hexacosanyl (meth)acrylate, and combinations thereof. Other useful (meth)acrylate monomers of alcohols having more than 20 carbons can be obtained, for example, by esterifying commercially available alcohols having more than 20 carbon atoms available under the trade designations "UNILIN" and "UNITHOX" (available from Baker Petrolite, Sugar Land, Tex.) with (meth)acryloyl chloride in the presence of a tertiary amine.

$C_{4-12}$ (meth)acrylate monomer units in the polymer may comprise from at least about 30, 35, 40, or even about 45 percent by weight up to and including about 50, 55, 60, 65, 70, or even about 80 percent by weight of the polymer. $C_{4-12}$ (meth)acrylate monomers may be linear or branched monofunctional (meth)acrylate esters of non-tertiary alcohols. These lower linear and branched acrylates may provide the properties of low glass transition temperature and viscoelastic characteristics that result in materials that are tacky in nature. Examples of the shorter chain, lower alkyl acrylates and methacrylates used in the invention include, for example, n-butyl (meth)acrylate, isobutyl (meth)acrylate, 2-ethylhexyl (meth)acrylate, isooctyl (meth)acrylate, n-octyl (meth)acrylate, 2-methylbutyl (meth)acrylate, isononyl (meth)acrylate, isoamyl (meth)acrylate, isodecyl (meth)acrylate, 4-methyl-2-pentyl (meth)acrylate, and combinations thereof.

Non-acidic polar monomer units may be included in the polymer in an amount of up to 20 percent by weight in the case of N-vinyl lactams, and in an amount up to including 10 percent by weight in the case of other monomers, however amounts of less than or equal to about 5 percent or even less than or equal to 1 percent are useful in many cases.

Useful ethylenically-unsaturated non-acidic polar monomers that may copolymerize with the $C_{4-12}$ (meth)acrylate and $C_{20+}$ (meth)acrylate monomers discussed hereinabove include N-vinyl lactams (e.g. N-vinylpyrrolidone, N-vinylcaprolactam), (meth)acrylamides including N-alkyl substituted (meth)acrylamides (e.g., acrylamide, N,N'-dimethyl (meth)acrylamide, N,N'-diethyl(meth)acrylamide), vinyl esters (e.g. vinyl acetate), hydroxyalkyl (meth)acrylates (e.g. 2-hydroxyethyl acrylate, 3-hydroxypropyl methacrylate), ether functional acrylates and methacrylates (e.g. methoxyethoxyethyl acrylate, ethoxyethoxyethyl acrylate), and combinations thereof. The non-acidic polar monomer should be at least essentially free of (i.e., contain less than 0.1 percent by weight) acidic groups (e.g., —$CO_2H$, —$PO_3H_2$, —$SO_3H$, and groups such as anhydride that can be readily converted under ambient temperature and humidity to acidic groups).

By maintaining a low acid content, heat-activatable adhesives according to the present invention may be used in situations (e.g., acid sensitive substrates) where low acid content is important (e.g., books, newspaper, photographs, adhesion to certain paints). Further, the presence of acidic monomers typically results in increased adhesive strength over time. In this regard, in addition to the polymer itself, adhesives according to the present invention are essentially free of, or even completely free of acidic groups.

In some embodiments, heat-activatable adhesives according to the present invention are sufficiently crosslinked that they become non-flowable at or above their activation temperature. Crosslinking the adhesive typically increases that cohesive strength and aids in removability.

Covalent crosslinking may be accomplished, for example, by incorporating or adding a crosslinking agent before the semi-crystalline polymer is used, and/or by including at least one multifunctional monomer (crosslinking monomer) in the monomer mixture prior to polymerization. Many crosslinking agents and processes are known, and may be used in practice of the present invention, provided they do not introduce sufficient acidic groups to render the adhesive not essentially acid-free.

Crosslinking agents that enhance the cohesive strength of the heat-activatable adhesive, include, for example, multifunctional (meth)acrylates (e.g., 1,4-butanediol di(meth)acrylate, 1,6-hexanediol di(meth)acrylate, pentaerythritol tri(meth)acrylate and polyfunctional (meth)acrylic monomers described in U.S. Pat. No. 4,379,201 (Heilmann et al.), the disclosure of which is incorporated herein by reference); chromophore-substituted halomethyl-s-triazines (e.g., those described by U.S. Pat. No. 4,329,384 (Vesley et al.); U.S. Pat. No. 4,330,590 (Vesley); and U.S. Pat. No. 4,379,201 (Vesley), the disclosures of which are incorporated herein by reference); mono-ethylenically-unsaturated aromatic ketones (e.g., 4-acryloyloxy-benzophenone, as described in U.S. Pat. No. 4,737,559 (Kellen et al.), the disclosure of which is incorporated herein by reference); and ethylenically-unsaturated silanes (e.g., mono-ethylenically-unsaturated mono-, di-, or tri-alkoxysilanes). Also useful are high glass transition temperature macromers and multivalent metal ions (e.g., zinc ions, titanium ions, magnesium ions, calcium ions, and combinations thereof).

In some embodiments of the present invention, the heat-activatable adhesive behaves like a pressure-sensitive adhesive at temperatures at or above its activation temperature (i.e., it can adhere to a substrate surface upon application of finger pressure, it is permanently tacky, and it can be removed cleanly from a smooth glass surface). In such embodiments, even after returning to room temperature, the adhesive retains significant elastomeric character allowing deformation of the adhesive during peel as is typically observed for pressure-sensitive adhesives. The only difference is that the tack is significantly reduced or non-existent, while the peel adhesion remains essentially unchanged or increases. Typically, the adhesion is low prior to activation because it does not achieve a tacky state, as is typically required for strong bond making. After activation, the adhesive can wet out the surface and higher peel strength can be obtained.

Heat-activatable polymeric adhesives according to the present invention have an activation temperature of at least about 40, 50 or even 60 degrees Celsius. In some embodiments, suitable for many temperature-sensitive substrates or readily available processing conditions (e.g., a hair dryer), the activation temperature is less than about 100 degrees Celsius or even less than about 70 degrees.

Semi-crystalline polymers used in practice of the present invention can be prepared using essentially any known polymerization method.

In one useful method, the desired monomers, typically along with the solvent, thermal initiator, and/or crosslinker, are charged into a reaction vessel. After the monomers are charged into the reaction vessel, the reaction vessel is purged with nitrogen to create an inert atmosphere. Once purged, the solution within the vessel is heated to a temperature above the decomposition temperature of the thermal initiator, whereupon the thermal initiator is gradually consumed until essentially all of the monomers are reacted. The solution of polymer may be coated "as is" onto a backing, or if desired the solvent may be stripped off, for example, by applying the mixture onto a siliconized release liner that is then heated resulting in solvent evaporation. Thus, an adhesive product is left in solid form. If desired, the adhesive can then be heated to reduce melt viscosity, coated onto a suitable backing, and then cured by exposure to a radiation (e.g., ultraviolet light) source.

Optionally, in addition to the semi-crystalline polymer described above, heat-activatable adhesives according to the present invention may include additional components. The components may be included before or after forming the semi-crystalline polymer. Examples of such optional components include fillers, fibers, colorants, tackifiers, fragrances, antioxidants, UV stabilizers, and combinations thereof. Heat-activatable adhesives of the present invention, depending upon their viscosity, can be coated via any of a variety of conventional coating methods, such as roll coating, knife coating, hot melt coating, or extrusion. For example, heat-activatable adhesives according to the present invention can be applied to at least a portion of at least one surface of a suitable flexible or inflexible backing and cured to produce adhesive sheet materials.

Useful backings may, for example, be in the form of strips, tapes, rolls, or sheets. Useful flexible backing materials include, for example, paper, plastic films such as poly(propylene), poly(ethylene), poly(vinyl chloride), poly(tetrafluoroethylene), polyester (e.g., polyethylene terephthalate), polyimide, cellulose acetate and ethyl cellulose. Useful backings also include woven fabric formed of threads of synthetic or natural materials such as cotton, nylon, rayon, glass, or ceramic material, or they can be of nonwoven fabric such as air-laid webs of natural or synthetic fibers, or a combination thereof. In addition, suitable backings can be formed of metal, metallized polymeric film, or ceramic sheet material. Adhesive-coated backings can take the form of any article conventionally known to be utilized with adhesives, such as labels, tapes, transfer tapes (comprising a film of the adhesive borne on at least one release liner), signs, covers, marking indices, and the like. Primers can be utilized, but they are not always necessary.

Objects and advantages of this invention are further illustrated by the following non-limiting examples, but the particular materials and amounts thereof recited in these examples, as well as other conditions and, details, should not be construed to unduly limit this invention.

EXAMPLES

This invention is further illustrated by the following examples that are not intended to limit the scope of the invention. These examples are merely for illustrative purposes only and are not meant to be limiting on the scope of the appended claims. All parts, percentages, ratios, etc. in the examples and the rest of the specification are by weight unless indicated otherwise.

Unless otherwise noted, all reagents used in the following examples were obtained, or are available, from general chemical suppliers such as Aldrich Chemical Company (Milwaukee, Wis.) or may be synthesized by known methods.

The following abbreviations are used throughout the following examples:

| ABBREVIATION | DESCRIPTION |
|---|---|
| EA | ethyl acrylate |
| BA | n-butyl acrylate |
| ABP | 4-acryloyl-oxy-benzophenone was prepared generally according the procedure of Example A of U.S. Pat. No. 4,737,559 (Kellen et al.), the disclosure of which is incorporated herein by reference. |
| NNDMA | N,N-dimethylacrylamide |
| BHA | behenyl acrylate, obtained from Cognis Corporation, Ambler, Pennsylvania |
| EHA | 2-ethylhexyl acrylate |

The following test methods were used in the following examples.

Gel Content Test

A known weight of the dry adhesive to be tested was placed on a pre-weighed screen basket. The polymer and screen were immersed in toluene heated to 70° C. and allowed to soak for 24 hours. After soaking, any remaining polymer on the screen was washed with more clean solvent and dried at 70° C. for 20 minutes. After drying, the sample was again weighed to obtain the weight of the polymer that remained on the screen. This procedure was repeated until a stable dry weight was obtained. The gel content was calculated as the ratio of the weight of polymer remaining on the screen after soaking divided by the original weight of polymer, multiplied by 100.

180° Peel Adhesion Before and After Activation Test

The peel adhesion test method described in ASTM D3330-90 was used, except that a glass substrate was substituted for the stainless steel substrate described in the test.

Adhesive coatings on polyester film were cut into 2.54 centimeters (cm) by 15 cm strips. Each strip was then adhered to a 10 cm by 20 cm clean, solvent washed glass coupon using a 2-kilogram rubber roller passed once over the strip at a speed of 30 cm per minute. The bonded assembly dwelled at room temperature for about one minute and was tested for 180° peel adhesion using a slip/peel tester (obtained under the trade designation "IMASS Model 3M90", from Instrumentors, Strongsville, Ohio) at a rate of 30 cm/minute (12 inches/minute) over a five second data collection time. This procedure was repeated with a second strip. The average value was reported as the "peel before activation".

To measure the "peel after activation", the edge of another sample was placed on the glass plate of the slip/peel tester and the strip of tape was activated by blowing hot air from a 1875 watt hair dryer onto the tape strip a few seconds to render it tacky. The activated strip was rolled onto the glass plate with a two kilogram (2 kg) roller and activated one more time with the hair dryer prior to using a second pass of the 2 kg rubber roller at a speed of 30 cm per minute. The tape was allowed to cool for 15 minutes and the peel test was run.

Crystalline Content Test

A sample of the heat-activatable adhesive was placed in a sealed aluminum pan and a scan was run on a differential scanning calorimeter (obtained under the trade designation "DSC 7" from Perkin-Elmer, Wellesley, Mass.) using a thermal profile of from 0° C. to 100° C. at a rate of 5 degrees per minute. The heat of fusion was determined by measuring the area of the peak for the melting point of the heat-activatable adhesive during the first upwards scan of the sample. The heat of fusion was determined for a polymer consisting of pure $C_{20+}$ (meth)acrylate monomer (the homopolymer) and the percent crystallinity for copolymers was determined by dividing the heat of fusion for the copolymer by the heat of fusion of the homopolymer multiplied by one hundred.

Removability Test

The adhesive samples were coated at about 25 micrometer dry thickness on a 37.5 micrometer thickness polyester backing. The dried adhesive was UV cured as described in the example section below and 5 to 10 cm wide tape samples were applied to a test substrate by heating the samples with a 1875 watt hairdryer held at about 5 cm distance from the tape surface. The heat was uniformly applied by moving the hair dryer back and forth across the tape surface. While being heated a 2 kg rubber roller was passed over the sample until the tape stuck well to the surface and made full contact with the substrate. The applied sample and substrate were allowed to cool to room temperature before any removability testing was carried out. Removability was tested 1 day after heat application and also 1 week after heat application. The tape samples were removed by hand at a peel rate of about 1 m per minute. The substrates were checked for adhesive residue by using a rag dusted with black toner powder and rubbing it over the substrate once the tape was removed. Any adhesive residue picked up toner so it became clearly visible. The test was carried out with both a rough surface represented by a latex painted piece of drywall and a smooth surface represented by a piece of glass.

Examples 1–6

Heat-activatable adhesives were prepared by mixing 40 grams of the monomers shown in Table 1 with 60 grams of a 50/50 (weight/weight) solvent mixture of ethylacetate/toluene, 0.12 grams of thermal initiator (obtained under the trade designation "VAZO 67" from E.I. du Pont de Nemours & Company, Wilmington, Del.) in a vessel, inerting the contents of the vessel, and polymerizing them by heating the contents to 60° C. for 24 hours. The resulting polymeric solutions were coated onto a 37.5 micrometers thick polyester film and dried for 15 minutes at 70° C. to give a dry adhesive coating of about 25 micrometers. The coated films were passed once (adhesive side facing the lamp) at 10 meters per minute through a ultraviolet light processor obtained under the trade designation "UV PROCESSOR MODEL MC-6RQN" from Fusion Systems Corporation, Gaithersburg, Md. equipped with a H-bulb operating at 100 percent power. To measure the heat of fusion, samples were coated in the same fashion, but a siliconized polyester release liner was used and a dry adhesive sample was taken without crosslinking it under the UV processor. The heat of fusion and the 180° peel adhesion before and after activation were determined as described in the test methods above. Results of testing are reported in Table 1.

Comparative Examples C1–C7

Comparative Examples C1–C7 were made according to the general procedure outlined in Example 1 using the monomer ratios reported in Table 1. The heat of fusion and the 180° peel adhesion before and after activation were determined as described in the test methods above. At low crystallinity aggressive and permanent room temperature tack was observed. As the crystallinity increased the tack disappeared. At high crystallinity the adhesion to glass was low before and after heat activation of the adhesive. Only when heated did some of these samples showed adhesion to the glass.

ABP 52/48/0.1. The Comparative Examples were tested for adhesion to glass following the application procedure described under the Removability Test above. Comparative Example C8 showed no adhesion to the glass after cooling and no further testing was performed. Comparative Example C9 was evaluated according to the 80° Peel Adhesion Before And After Activation Test described above. Results of testing are reported in Table 3 (below).

TABLE 1

| Example | EHA/BHA/ABP monomer ratio, percent by weight | Aggressively tacky prior to activation | Peel Before Activation, Newtons/decimeter | Peel After Activation, Newtons/decimeter | Heat of Fusion (Joules/gram) | Percent Crystallinity |
|---|---|---|---|---|---|---|
| C1 | 80/20/0.1 | Yes | 6.2 | 10.6 | 0 | 0 |
| C2 | 70/30/0.1 | Yes | 10.5 | 13.4 | 1.0 | 0.87 |
| 1 | 60/40/0.1 | No | 20.4 | 29.9 | 7.2 | 6.23 |
| 2 | 58/42/0.1 | No | 25.3 | 33.4 | 16.7 | 14.46 |
| 3 | 56/44/0.1 | No | 39.2 | 47.6 | 13.5 | 11.69 |
| 4 | 54/46/0.1 | No | 23.7 | 43.6 | 20.2 | 17.32 |
| 5 | 52/48/0.1 | No | 20.1 | 42.4 | 21.9 | 18.96 |
| 6 | 50/50/0.1 | No | 18.5 | 22.1 | 27.5 | 23.81 |
| C3 | 45/55/0.1 | No | 3.4 | 2.9 | 31.9 | 27.62 |
| C4 | 40/60/0.1 | No | 0 | 1.6 | 38.4 | 33.25 |
| C5 | 30/70/0.1 | No | 0 | 0 | 62.7 | 54.29 |
| C6 | 20/80/0.1 | No | 0 | 0 | NM | NM |
| C7 | 100/0/0 | No | 0 | 0 | 115.5 | 100 |

In Table 1 (above), NM means not measured.

Examples 7–8

Adhesive prepared according to the procedure of Example 5 described above was subjected to the Removability Test both before and after exposure to ultraviolet radiation. The results of testing are reported in Table 2 below as Example 7.

In addition, an adhesive having a 52/48/0.075 EHA/BHA/ABP ratio, and made using the method of Example 5, was tested and the results are summarized in Table 2 below as Example 8.

The gel content of Examples 7 and 8 (after curing) was determined according to the Gel Content Test and is included in Table 2.

TABLE 2

| Example | UV Cured | Gel Content, percent | Removability Test | |
|---|---|---|---|---|
| | | | Painted Drywall | Glass |
| 7 | No | 0 | Residue | Clean |
|   | Yes | 65 | Clean | Clean |
| 8 | No | 0 | Residue | Clean |
|   | Yes | 8.2 | Clan | Clean |

Comparative Examples C8 and C9

Comparative Example C8 was prepared by dissolving 50 grams of a commercial hot melt adhesive obtained under the trade designation "JETMELT EC3755" from 3M Company in 50 grams of hot toluene and coating the solution onto a 37.5 micrometers thick polyester film to obtain a dry hot melt adhesive coating thickness of about 25 micrometers.

Comparative Example C9 was made following the procedure of Example 1 using a monomer ratio of EA/BHA/

TABLE 3

| Example | Peel Before Activation, Newtons/decimeter | Peel After Activation, Newtons/decimeter |
|---|---|---|
| C8 | NM | NM |
| C9 | 0.55 | 3.0 |

Various unforeseeable modifications and alterations of this invention may be made by those skilled in the art without departing from the scope and spirit of this invention, and it should be understood that this invention is not to be unduly limited to the illustrative embodiments set forth herein.

What is claimed is:

1. A heat-activatable adhesive comprising a semi-crystalline polymer, the semi-crystalline polymer comprising:
   (a) about 20 to about 70 percent by weight of alkyl (meth)acrylate monomer units having an alkyl group that contains at least about 20 carbon atoms; and
   (b) about 80 to about 30 percent by weight of alkyl (meth)acrylate monomer units having an alkyl group that contains from about 4 to about 12 carbon atoms, wherein the polymer has an activation temperature of at least about 40 degrees Celsius, and wherein the polymer is essentially free of acidic groups.

2. The heat-activatable adhesive of claim 1, wherein the polymer is crosslinked.

3. The heat-activatable adhesive of claim 1, wherein the polymer comprises about 40 to about 60 percent by weight of alkyl (meth)acrylate monomer units having an alkyl group that contains at least about 20 carbon atoms.

4. The heat-activatable adhesive of claim 1, wherein the polymer comprises about 45 to about 55 percent by weight of alkyl (meth)acrylate monomer units having an alkyl group that contains at least about 20 carbon atoms.

5. The heat-activatable adhesive of claim 1, wherein the polymer comprises about 35 to about 50 percent by weight of alkyl (meth)acrylate monomer units having an alkyl group that contains at least 22 carbon atoms.

6. The heat-activatable adhesive of claim 1, wherein the polymer comprises about 40 to about 50 percent by weight of behenyl acrylate.

7. The heat-activatable adhesive of claim 1, wherein the polymer comprises about 70 to about 50 percent by weight of alkyl (meth)acrylate monomer units having an alkyl group that contains from about 4 to about 12 carbon atoms.

8. The heat-activatable adhesive of claim 1, wherein the polymer comprises about 65 to about 45 percent by weight of alkyl (meth)acrylate monomer units having an alkyl group that contains from about 4 to about 12 carbon atoms.

9. The heat-activatable adhesive of claim 1, wherein the composition has a crystalline content by weight of from about 10 to about 30 percent.

10. The heat-activatable adhesive of claim 1, wherein the adhesive has a crystalline content by weight of from about 15 to about 25 percent.

11. The heat-activatable adhesive of claim 1, wherein the adhesive is aggressively tacky at least one temperature above the activation temperature.

12. The heat-activatable adhesive of claim 1, wherein the polymer comprises less than about one percent by weight of crosslinking monomer units.

13. The heat-activatable adhesive of claim 1, wherein the activation temperature is at least about 40 degrees Celsius.

14. The heat-activatable adhesive of claim 1, wherein the activation temperature is less than about 100 degrees Celsius.

15. A heat-activatable adhesive comprising a semi-crystalline polymer, the semi-crystalline polymer comprising:
(a) about 20 to about 70 percent by weight of alkyl (meth)acrylate monomer units having an alkyl group that contains at least about 20 carbon atoms;
(b) about 80 to about 30 percent by weight of alkyl (meth)acrylate monomer units having an alkyl group that contains from about 4 to about 12 carbon atoms; and
(c) ethylenically-unsaturated non-acidic polar monomer units in an amount of less than about 20 percent by weight, wherein the polymer has an activation temperature of at least about 40 degrees Celsius, and wherein the polymer is essentially free of acidic groups.

16. The heat-activatable adhesive of claim 15, wherein the polymer is crosslinked.

17. The heat-activatable adhesive of claim 15, wherein the polymer comprises about 40 to about 60 percent by weight of alkyl (meth)acrylate monomer units having an alkyl group that contains at least 20 carbon atoms.

18. The heat-activatable adhesive of claim 15, wherein the polymer comprises about 45 to about 55 percent by weight of alkyl (meth)acrylate monomer units having an alkyl group that contains at least 20 carbon atoms.

19. The heat-activatable adhesive of claim 15, wherein the polymer comprises about 30 to about 70 percent by weight of alkyl (meth)acrylate monomer units having an alkyl group that contains at least 22 carbon atoms.

20. The heat-activatable adhesive of claim 15, wherein the polymer comprises about 30 to about 70 percent by weight of behenyl acrylate.

21. The heat-activatable adhesive of claim 15, wherein the polymer comprises about 60 to about 40 percent by weight of alkyl (meth)acrylate monomer units having an alkyl group that contains from about 4 to about 12 carbon atoms.

22. The heat-activatable adhesive of claim 15, wherein the polymer comprises about 55 to about 45 percent by weight of alkyl (meth)acrylate monomer units having an alkyl group that contains from about 4 to about 12 carbon atoms.

23. The heat-activatable adhesive of claim 15, wherein the ethylenically-unsaturated non-acidic polar monomer units are present in an amount of less than about 10 percent by weight.

24. The heat-activatable adhesive of claim 15, wherein the ethylenically-unsaturated non-acidic polar monomer units are present in an amount of less than about 5 percent by weight.

25. The heat-activatable adhesive of claim 15, wherein the ethylenically-unsaturated non-acidic polar monomer units comprise are selected from the group consisting of N-vinyl lactams, acrylamides, hydroxyalkyl (meth)acrylates, and combinations thereof.

26. The heat-activatable adhesive of claim 15, wherein the adhesive has a crystalline content by weight of from about 10 to about 30 percent.

27. The heat-activatable adhesive of claim 15, wherein the adhesive has a crystalline content by weight of from about 15to about 25 percent.

28. The heat-activatable adhesive of claim 15, wherein the adhesive is a pressure-sensitive adhesive at least one temperature above the activation temperature.

29. The heat-activatable adhesive of claim 15, wherein the activation temperature is at least about 60 degrees Celsius.

30. The heat-activatable adhesive of claim 15, wherein the activation temperature is less than about 100 degrees Celsius.

31. A method of making a heat-activatable adhesive comprising:
(a) providing a mixture of polymerizable components comprising about 20 to about 70 percent by weight of alkyl (meth)acrylate monomer having an alkyl group that contains at least about 20 carbon atoms, about 80 to about 30 percent by weight of alkyl (meth)acrylate monomer having an alkyl group that contains from about 4 to about 12 carbon atoms; and
(b) polymerizing the mixture to provide a semi-crystalline polymer, wherein the semi-crystalline polymer has an activation temperature of at least about 40 degrees Celsius, and wherein the polymer is essentially free of acidic groups.

32. The method of claim 31, wherein the mixture further comprises a crosslinking monomer.

33. The method of claim 31, wherein the mixture further comprises less than about 20 percent by weight of ethylenically-unsaturated non-acidic polar monomer.

34. The method of claim 31, wherein the mixture further comprises ethylenically-unsaturated non-acidic polar monomer in an amount of less than about 5 percent by weight.

35. The method of claim 31, further comprising incorporating the semi-crystalline polymer into a heat-activatable adhesive formulation.

36. A heat-activatable adhesive article comprising:
a substrate having a major surface; and
a layer of heat-activatable adhesive comprising a semi-crystalline polymer and supported on at least a portion of the major surface, wherein the semi-crystalline polymer comprises:
(a) about 20 to about 70 percent by weight of alkyl (meth)acrylate monomer units having an alkyl group that contains at least about 20 carbon atoms; and
(b) about 80 to about 30 percent by weight of alkyl (meth)acrylate monomer units having an alkyl group that contains from about 4 to about 12 carbon atoms, wherein the polymer is crosslinked, wherein the polymer has an activation temperature of at least about 40 degrees Celsius, and wherein the semi-crystalline polymer is essentially free of acidic groups.

37. The heat-activatable adhesive article of claim 36, wherein the polymer is crosslinked.

38. The heat-activatable adhesive article of claim 36, wherein the semi-crystalline polymer comprises about 40 to about 60 percent by weight of alkyl (meth)acrylate monomer units having an alkyl group that contains at least 18 carbon atoms.

39. The heat-activatable adhesive article of claim 36, wherein the semi-crystalline polymer comprises about 45 to about 55 percent by weight of alkyl (meth)acrylate monomer units having an alkyl group that contains at least 18 carbon atoms.

40. The heat-activatable adhesive article of claim 36, wherein the semi-crystalline polymer comprises about 40 to about 70 percent by weight of alkyl (meth)acrylate monomer units having an alkyl group that contains at least 22 carbon atoms.

41. The heat-activatable adhesive article of claim 36, wherein the semi-crystalline polymer comprises about 40 to about 70 percent by weight of behenyl acrylate.

42. The heat-activatable adhesive article of claim 36, wherein the semi-crystalline polymer comprises about 60 to about 40 percent by weight of alkyl (meth)acrylate monomer units having an alkyl group that contains from about 4 to about 12 carbon atoms.

43. The heat-activatable adhesive article of claim 36, wherein the semi-crystalline polymer comprises about 55 to about 45 percent by weight of alkyl (meth)acrylate monomer units having an alkyl group that contains from about 4 to about 12 carbon atoms.

44. The heat-activatable adhesive article of claim 36, wherein the adhesive has a crystalline content by weight of from about 10 to about 30 percent.

45. The heat-activatable adhesive article of claim 36, wherein the adhesive has a crystalline content by weight of from about 15 to about 25 percent.

46. The heat-activatable adhesive article of claim 36, wherein the adhesive is a pressure-sensitive adhesive at at least one temperature above the activation temperature.

47. The heat-activatable adhesive article of claim 46, wherein the semi-crystalline polymer comprises less than about one percent by weight of crosslinking monomer units.

48. The heat-activatable adhesive of claim 36, wherein the activation temperature is at least about 60 degrees Celsius.

49. The heat-activatable adhesive of claim 36, wherein the activation temperature is less than about 100 degrees Celsius.

* * * * *

UNITED STATES PATENT AND TRADEMARK OFFICE
CERTIFICATE OF CORRECTION

PATENT NO. : 7,008,680 B2  Page 1 of 1
DATED : March 7, 2006
INVENTOR(S) : Everaerts, Albert I.

It is certified that error appears in the above-identified patent and that said Letters Patent is hereby corrected as shown below:

<u>Column 9,</u>
Line 54, Table 2, delete "clan" and insert -- clean --.

<u>Column 12,</u>
Line 23, delete "15to" and insert -- 15 to --.

Signed and Sealed this

Thirtieth Day of May, 2006

JON W. DUDAS
*Director of the United States Patent and Trademark Office*